United States Patent Office 3,177,417
Patented Apr. 6, 1965

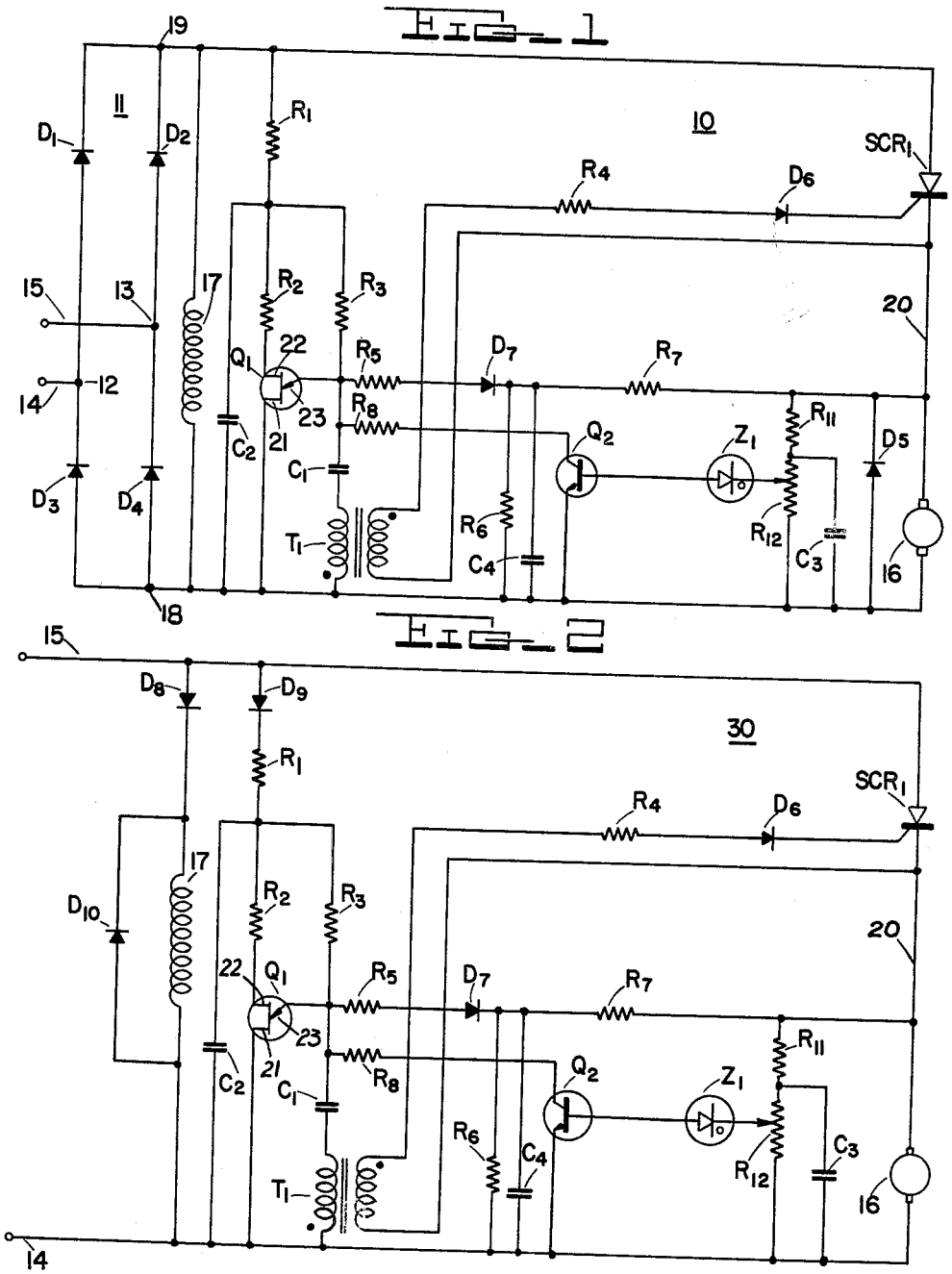

3,177,417
MOTOR CONTROL SYSTEM RESPONSIVE
TO ARMATURE C.E.M.F.
Floyd H. Wright, Fort Wayne, Ind., assignor to General
Electric Company, a corporation of New York
Filed Sept. 17, 1962, Ser. No. 224,115
11 Claims. (Cl. 318—331)

This invention relates to electrical motor control circuits and systems. More particularly, it relates to such control circuits and systems for regulating and controlling the speed and starting characteristics of D.C. motors of the shunt type.

Control of the power supplied to a load, such as a motor, may be achieved by using phase control circuits employing solid state power devices. Solid state power devices, such as silicon controlled rectifiers, are particularly suitable for use in phase control circuits since they can be switched from a conducting to a blocking state in a matter of several microseconds. The phase angle at which the controlled rectifier is fired determines the interval that current or power is supplied to the motor in the half cycle. Usually, the controlled rectifier is symmetrically fired with respect to each phase of the power supply so that an equal loading of each phase of the power supply results.

The use of phase control circuits employing solid state power devices in motor control systems is desirable since such phase control circuits can readily control loads of varying power factor and since it is possible to provide control systems which are only a small fraction of the size and weight of conventional systems utilizing mechanical controls performing comparable functionns.

Although the advantages accruing from the use of phase control circuits employing solid state power devices have been recognized, these advantages have not generally been realized in practice. One of the drawbacks to the application of solid state power devices, such as silicon controlled rectifiers, to control systems for motors has been the large starting currents normally required by the motors. In order to protect the solid state power device against possible destruction due to the high starting current and to make it possible to employ less expensive devices, it is desirable if not necessary that some limit be provided on the current during the starting interval. It will be appreciated that under stall conditions the armature current in a D.C. shunt motor with a half horsepower rating may reach a hundred or more amperes and unless this current is reduced, the power device must be capable of handling the maximum starting current.

Another difficulty encountered in control systems embodying half wave or full wave phase control circuits to control the speed of the motor is that satisfactory speed regulation over a wide range of speeds has not been readily achieved. Thus, there is a need for a D.C. motor control system employing phase control circuits using solid state power devices in which the stall current in the armature is effectively limited and in which provision is made for satisfactory regulation of speed over a wide range of speeds.

Accordingly, it is the general object of the present invention to provide an improved control circuit and system for a shunt wound motor.

Another object of the present invention is to provide an improved control system for motors employing a solid state power device wherein the low speed current of the motor is limited to a predetermined value to prevent destruction of the solid state power device, the current control being achieved without means for sensing the current directly as is done in vacuum tube circuits.

It is another object of the invention to provide a control system for a shunt commutator motor utilizing solid state control elements to exercise phase control over the power supplied to the motor wherein speed regulation is achieved over a wide range of speeds.

A further object of the present invention is to provide an improved speed control system for operating D.C. shunt motors from a cyclical power source such as an unfiltered rectified alternating supply.

In accordance with one form of my invention, I have provided a control circuit for operating a shunt wound motor from a cyclical power source, such as an unfiltered rectified alternating supply. The motor is operated by unidirectional pulses of current which are controlled by a phase control circuit means. The phase control circuit means includes a solid state switching or power device, such as a silicon controlled rectifier, and a charging capacitor. The rate at which charging current is supplied to the charging capacitor determines the point in each half cycle of the cyclical power source when the solid state switching device is fired to allow current to flow to the armature. In order to control the power supplied to the motor, a current control means is connected in circuit with the charging capacitor for adjustably varying the charging current supplied to the charging capacitor.

Speed regulation is achieved by a circuit which includes a circuit means that provides a path for current to be diverted or shunted from the charging capacitor and includes a variable impedance means, such as a transistor, to limit the current diverted. A reference voltage means, for example, a Zener diode, is coupled with the variable impedance means. The impedance of the variable impedance means is varied in response to the difference between the reference voltage and a feedback signal applied at the reference voltage means by a feedback circuit.

When the speed of the motor exceeds a selected speed, the armature voltage increases, and the feedback signal at the reference voltage means increases to cause the impedance in the path of the current being diverted to decrease and to thereby cause the solid state switching device to be fired later in the half cycle and decrease the speed of the motor to compensate for the increased speed. Conversely, when the motor slows down below the selected speed, the armature voltage also falls off. Thus, the feedback signal decreases in magnitude causing the impedance in the path of the current diverted from the charging capacitor to increase. The solid state switching device is fired earlier in the half cycle to provide more power to the motor to compensate for the decrease in speed below the selected level.

In another aspect of the invention, an impedance element, such as a resistor and a unidirectional conducting device, such as a diode, are connected serially and in circuit with the charging capacitor and the armature of the motor. The unidirectional device is poled to conduct current away from the charging capacitor when the back electromotive force of the armature is zero or the motor is at a standstill. When the motor comes up to speed, the back electromotive force causes the shunted current to be gradually decreased until the unidirectional device is in a blocking state. In this manner, the starting current is limited to a predetermined level, and the solid state switching device is safeguarded against excessive starting current.

The subject matter which I regard as my invention is set forth in the appended claims. The invention itself, however, together with further objects and advantages thereof may be understood by referring to the following description taken in connection with the accompanying drawing in which:

FIGURE 1 is a schematic circuit diagram of a motor control system embodying one form of my invention; and FIGURE 2 is a schematic diagram illustrating another control circuit embodying the present invention.

In the illustration shown in FIGURE 1, the control system 10 embodying the invention includes a full wave bridge 11 comprised of the four diodes $D_1$, $D_2$, $D_3$ and $D_4$. The input terminals 12, 13 of the full wave bridge 11 are adapted to be connected to a suitable alternating current supply, such as a 115 volt, 60 cycle supply by means of the input terminal leads 14, 15.

The motor controlled by the circuit 10 is shown schematically by the armature 16 and the shunt winding 17. It will be seen that the armature 16 is connected inside the full wave bridge 11 across the output terminals 18, 19 and in series circuit with a controlled rectifier $SCR_1$. The armature 16 is energized by pulses of power provided when the controlled rectifier $SCR_1$ is switched on in each half cycle. A free wheeling diode $D_5$ is connected across the armature 16 to maintain the current flow through the armature 16 but not through the controlled rectifier $SCR_1$ when the source voltage passes through zero.

The controlled rectifier $SCR_1$, used in the illustrated embodiment of the invention, was a solid state power or switching device comprising a semiconductive body having four zones, the contiguous zones being of opposite conductivity type and defining at least three P-N junctions. Electrodes are provided at the two end zones and one at an intermediate zone. The anode of the controlled rectifier $SCR_1$ is represented in the drawings by the arrow symbol, the cathode is represented by a line drawn through the apex of the arrow symbol and the gate electrode is represented by a diagonal line extending from the cathode.

The operating characteristics of a silicon controlled rectifier are such that it conducts in a forward direction with a forward characteristic very similar to that of an ordinary rectifier when a small gate signal is applied. When the polarity of the voltage applied across the controlled rectifier is such that the outside P— layer is positive with respective to the outside N— layer, the two outside junctions are biased in a forward direction while the inner junction is reversely biased. Current does not flow through the controlled rectifier under these conditions except for a small leakage current.

When a signal is applied at the gate electrode, the controlled rectifier $SCR_1$ conducts in a forward direction and will continue to conduct after the gate signal is removed. Conduction continues as long as the current through the controlled rectifier $SCR_1$ remains at a value greater than the holding current value. To turn the controlled rectifier off, the current flow through the controlled rectifier $SCR_1$ must fall below this value. Thus, in the exemplification of the invention, the free wheeling diode $D_5$ was used to insure that the current flow through the controlled rectifier $SCR_1$ drops below the holding current value. It was found that the inductive decay current in certain armatures was sufficient to prevent the controlled rectifier $SCR_1$ from turning off at the end of the cycle.

The speed of the motor is controlled by pulses of power supplied to the motor armature 16 as the controlled rectifier $SCR_1$ is switched on by the unijunction firing circuit. Since the unijunction firing circuit is energized from the output terminals 18, 19 of the full wave bridge 11, it is synchronized with the alternations of the power supply. Essentially, the unijunction firing circuit is a relaxation oscillator and includes a unijunction transistor $Q_1$ having a base-one electrode 21, a base-two electrode 22, and emitter electrode 23. Resistor $R_1$ is a voltage dropping resistor and maintains the peak voltage of the unijunction transistor $Q_1$ within certain specified limits. Resistor $R_2$ is connected with the base-two electrode 22 and limits the current thereto. A resistor $R_3$ is connected in circuit with a charging capacitor $C_1$, and controls the maximum amount of charging current supplied to the charging capacitor $C_1$. The capacitor $C_2$ connected across the base-one and base-two electrodes 21, 22 of the unijunction transistor $Q_1$ filters power line noise.

A small pulse transformer $T_1$ provides D.C. isolation and A.C. coupling between the firing circuit and the controlled rectifier $SCR_1$. A diode $D_6$ connected in circuit with the gate of the controlled rectifier $SCR_1$ is provided to prevent a reverse voltage from being applied across the cathode and the gate of the controlled rectifier $SCR_1$. A resistor $R_4$ limits the peak gate current to the values specified for the particular controlled rectifier employed.

The unijunction transistor $Q_1$, or double base diode as it is frequently referred to, is a three terminal device having a stable negative resistance characteristic. Between the base-one and base-two electrodes 21, 22 of the unijunction transistor $Q_1$, the device exhibits the characteristics of an ordinary resistor. As long as voltage at the emitter 23 is less than the peak point voltage of the unijunction transistor $Q_1$, the emitter 23 is reversely biased and substantially no current flows from the emitter 23 to the base-one electrode 21. However, when the emitter voltage exceeds the peak point voltage and the emitter current is greater than the current corresponding to the emitter peak point voltage, the unijunction transistor $Q_1$ becomes conducting. The point in each cycle of the cyclical source at which the emitter 23 reaches the peak point value is controlled by the RC circuit, which includes the charging capacitor $C_1$ and the variable resistor $R_3$, and by the control circuits which will be hereinafter more fully described.

In accordance with the improved arrangement of the invention, the armature current is effectively limited at standstill and low speeds by diverting or shunting current from the charging capacitor $C_1$. The function of the current limiting circuit is to prevent the armature 16 from drawing excessive current from the power supply at stall and low speeds. It is comprised of resistors $R_5$, $R_6$ and $R_7$ and the diode $D_7$ which is connected to the junction or connection 20 between the cathode of the controlled rectifier $SCR_1$ and the armature 16. When the diode $D_7$ is forward biased, current is diverted from the charging capacitor $C_1$ to ground. Diversion of current from the charging capacitor $C_1$ decreases the conduction period of the controlled rectifier $SCR_1$ in each cycle and thereby limits the armature current during the first half cycle. As the armature 16 comes up to a preselected speed, the back electromotive force limits the armature current, and the current limiting circuit becomes ineffective since the back electromotive force causes the diode $D_7$ to become reversed biased and to block the diversion of current from the charging capacitor $C_1$.

The voltage divider action of resistors $R_6$ and $R_7$ controls the point or speed at which diode $D_7$ is reversely biased. As the resistance introduced into the circuit by resistor $R_7$ is varied, the speed at which diode $D_7$ will revert to a blocking state and render the current limiting circuit ineffective will vary. Preferably, the preselected speed for a given motor application is one at which the motor will inherently limit the armature current below some desired level, which in the exemplification of the invention was 15 amperes.

The resistors $R_5$ and $R_6$ were chosen to limit the locked rotor armature currrent to a desired value. Resistor $R_5$ may be a variable resistor if it is desired to vary the locked rotor current and thereby vary the starting torque of the motor. Capacitor $C_4$ filters electrical noise from the motor armature 16. With the currrent limiting arrangement of the present invention, it was possible, in the exemplification of the invention to be hereinafter more fully described, to use a C35B silicon controlled rectifier to control a one horsepower D.C. shunt motor and to limit the armature current to less than 15 amperes during the entire accelerating range.

Speed regulation is achieved by a control circuit which includes resistors $R_8$, $R_9$, $R_{10}$, $R_{11}$, an NPN transistor $Q_2$, diode $D_8$, Zener diode $Z_1$, a potentiometer $R_{12}$ and a capacitor $C_3$. Capacitor $C_3$ filters electrical commutator noise from the motor armature 16. Resistor $R_8$ sets the limit on the current diverted from the charging capacitor $C_1$. The resistor $R_{11}$ and the potentiometer $R_{12}$ function as a voltage divider to apply a proportional part of the back electromotive force of the armature 16 at the Zener diode $Z_1$, the potentiometer $R_{12}$ being used to control the motor speed. The Zener diode $Z_1$ serves as a reference voltage means and allows current to flow to the base electrode of transistor $Q_2$ when the voltage at the arm of the potentiometer $R_{12}$ is greater than the breakdown voltage of the Zener diode $Z_1$.

The speed control circuit senses the back electromotive force across the armature 16 and corrects the firing time of the unijunction transistor $Q_1$ by diverting more or less current as may be required to keep the back electromotive force constant and thereby keep the speed constant. At low speeds, the back electromotive force will reflect a greater percentage of change in base current to the transistor $Q_2$ than it will at high speed because of the voltage divider action. A silicon type of high gain transistor $Q_2$ should preferably be used since silicon transistors do not have a relatively large collector to emitter leakage at high temperatures as do germanium transistors. High leakage current reduces the locked rotor current and thereby reduces the starting torque at high temperature.

Normally, during operation the Zener diode $Z_1$ is in a conducting state, and transistor $Q_2$ is biased into an "on" state. When in the "on" state, transistor $Q_2$ has a low resistance from collector to the emitter electrode and current is diverted from the charging capacitor C, the transistor $Q_2$ functioning as a variable impedance means. The impedance between the emitter and collector of transistor $Q_2$ varies with the amount of current applied at the base of transistor $Q_2$. Thus, the amount of current diverted from capacitor $C_1$ depends upon the difference between the magnitude of the feedback signal corresponding to the back electromotive force of the armature 16 and the magnitude of the breakdown voltage of the Zener diode $Z_1$, since this difference determines the amount of base current supplied to transistor $Q_2$.

In FIGURE 2, I have illustrated a half wave control circuit 30 for the D.C. shunt motor, which is shown schematically by the armature 16 and the field winding 17. It will be noted that the controlled rectifier $SCR_1$ is not connected within a full wave bridge. The diodes $D_8$ and $D_9$ which are connected in circuit with field winding 17 and the firing circuit, cause the field winding 17 and firing circuit, respectively, to be energized in alternate half cycles. Controlled rectifier $SCR_1$ is poled so that it can be fired in each alternate half cycle when the diodes $D_8$ and $D_9$ are conducting. A diode $D_{10}$ is provided in shunt with the field winding 17 so that a path is provided for the inductive current in the winding when the diode $D_8$ reverts to a blocking state.

In this exemplification of the invention, a free-wheeling diode was not used across the armature 16 since the current resulting from the armature inductance did not cause the current flow through the controlled rectifier $SCR_1$ at the end of each half cycle to exceed the holding current value. Essentially, the control circuits and the circuit functions are exactly the same as for the full wave circuit shown in FIGURE 1. Accordingly, I have used the same reference numerals to identify the corresponding parts of the two control circuits. The half wave control circuit shown in FIGURE 2 operates in substantially the same manner as shown in FIGURE 1 except that power is supplied to the motor only in alternate half cycles.

Having reference now to FIGURE 1, the operation of the speed control and regulating circuit will now be more fully described. When the input terminal leads 14, 15 of control circuit 10 are energized, the controlled rectifier $SCR_1$ is subjected to a single phase full wave rectified sine wave. Thus, the controlled rectifier $SCR_1$ is forward biased in each half cycle. When the polarity of the voltage applied across the input terminal leads 14, 15 is such that terminal lead 15 is positive with respect to terminal lead 14, the main current flow, when controlled rectifier $SCR_1$ is conducting, is through diode $D_2$, controlled rectifier $SCR_1$, the armature 16, and diode $D_3$ to the terminal lead 14.

When the voltage at input terminal lead 14 is positive with respect to the voltage at input lead 15, the path of current flow is through diode $D_1$, controlled rectifier $SCR_1$, the armature 16 and diode $D_4$ to input terminal lead 15. It will be noted that the field winding 17 is energized in each half cycle regardless of the state of the controlled rectifier $SCR_1$.

The power supplied to the armature 16 is controlled by delaying or advancing the point in each half cycle in which the controlled rectifier $SCR_1$ is triggered into conduction. The unijunction firing circuit provides a positive pulse at the gate electrode at a particular point at each half cycle, thereby causing the controlled rectifier $SCR_1$ to be switched from its blocking state to its conducting state. When the voltage across the charging capacitor $C_1$ reaches a value equal to or in excess of the emitter peak point voltage of the unijunction transistor $Q_1$, the unijunction transistor $Q_1$ is fired causing capacitor $C_1$ to discharge through the primary winding of the pulse transformer $T_1$. The discharge of the capacitor $C_1$ also results in a lowering of the emitter voltage, and the unijunction transistor $Q_1$ is turned off.

The initial surge of current to the armature 16 is limited by the control circuit 10 in the following manner: When the control circuit 10 is first energized, the back electromotive force of the armature 16 is zero, the diode $D_7$ is forward biased and current is diverted from the charging capacitor $C_1$ through the resistors $R_5$ and $R_6$. In the first half cycle, the conduction angle of the controlled rectifier $SCR_1$ is small regardless of the speed control setting on potentiometer $R_{12}$. Essentially, as the motor comes up to the preselected speed, the voltage across the resistor $R_6$ exceeds the voltage across capacitor $C_1$, and diode $D_7$ is reversely biased and blocks the current flow away from the capacitor $C_1$. Resistor $R_7$ controls the point at which the diode $D_7$ is reversed biased.

Let us now consider the manner in which the control circuit 10 regulates the speed of the shunt motor for a selected setting of the potentiometer $R_{12}$. As the motor speed falls off slightly, the motor back electromotive force falls off. This causes the voltage at the arm of the potentiometer $R_{12}$ to be less. Thus, the different between this voltage and the forward breakover voltage of the Zener diode $Z_1$ decreases. Consequently, the current supplied to the base of the transistor $Q_2$ is decreased and the impedance between the emitter and collector of transistor $Q_2$ increases thereby causing less current to be shunted from capacitor $C_1$. As a result, the unijunction transistor $Q_1$ is fired earlier in the half cycle causing the controlled rectifier $SCR_1$ to be fired earlier and to conduct for a longer interval to supply more power to the armature 16 to compensate for the reduction in speed. Conversely, when the motor over-speeds, the voltage at the arm of potentiometer $R_{12}$ increases thereby increasing the base current to transistor $Q_2$. The impedance between the emitter and collector of transistor $Q_2$ is decreased and more current is diverted from the capacitor $C_1$ thereby reducing the conduction angle of the controlled rectifier $SCR_1$ in the half cycle to compensate for the over-speeding.

In order to aid those skilled in the art of the practice of the present invention, a control circuit constructed in accordance with the present invention utilizes the following circuit components which are given by way of exemplification only:

| | |
|---|---|
| Diodes $D_1, D_2, D_3, D_4, D_5$ | General Electric 1N1202. |
| Diodes $D_6, D_7$ | General Electric 1N1695. |
| Zener diode $D_1$ | Hoffman 1N1315. |
| Unijunction transistor $Q_1$ | General Electric 2N492. |
| Transistor $Q_2$ | General Electric 2N169A. |
| Transformer $T_1$ | Sprague 31Z204. |
| Capacitor $C_1$ | 0.1 microfarad. |
| Capacitor $C_2$ | .015 microfarad. |
| Capacitor $C_3$ | .22 microfarad. |
| Capacitor $C_4$ | .033 microfarad. |
| Resistor $R_1$ | 18,000 ohms, ½ watt. |
| Resistor $R_2$ | 390 ohms, ½ watt. |
| Resistor $R_3$ | 25,000 ohms, ½ watt. |
| Resistor $R_4$ | 100 ohms, ½ watt. |
| Resistor $R_5$ | 0–20,000 ohms (variable resistor). |
| Resistor $R_6$ | 2700 ohms, ½ watt. |
| Resistor $R_7$ | 18,000 ohms, ½ watt. |
| Resistor $R_8$ | 0–5,000 ohms (variable resistor). |
| Resistor $R_{11}$ | 2700 ohms, ½ watt. |
| Potentiometer $R_{12}$ | 0–2,500 ohms. |

The control circuit employing the foregoing components was used to operate a one horsepower D.C. shunt motor. A 15 ampere fuse was connected in series circuit with the armature 16. The motor could be started without any surge currents in excess of 15 amperes. The armature resistance of the motor was approximately 0.1 ohm and the self-inductance of the motor was approximately .001 henry. The motor was operated from 110 volt, 60 cycle power supply and was brought up to full speed of 10,000 revolutions per minute without blowing the fuse.

As was previously mentioned, the control circuit 30 illustrated in FIGURE 2 performs the speed regulating and current limiting functions in the same manner as the control circuit shown in FIGURE 1. However, the armature 16 is energized only in each alternate half cycle. Also, the field winding 17 and the firing circuit are energized in the same alternate half cycles. The armature 16 at stall and slow speeds is prevented from drawing too much current since the diode $D_7$ conducts current away from the charging capacitor $C_1$ thereby limiting the conduction angle of the controlled rectifier $SCR_1$ until the back electromotive force is sufficient in magnitude to cause the diode $D_7$ to be reversely biased.

The speed of the motor is controlled by the potentiometer 12 which controls the magnitude of the feedback signal from the armature 16. For a selected speed setting, speed regulation is achieved in the same manner as in the circuit shown in FIGURE 1 except that only one speed correction is made per cycle as compared with two in the circuit of FIGURE 1.

From the foregoing description of the particular embodiments of the invention, it will be apparent that many modifications may be made. For example, it will be apparent to those skilled in the art that Shockley diodes may be used in place of the unijunction transistors in the firing circuits. The Shockley diode is essentially a low power silicon controlled rectifier without a gate and is triggered into conduction when the forward voltage limit of the Shockley is exceeded. Shockley diodes and other similar solid state devices may be used to replace the unijunction transistor. It will be also apparent that other bridge circuit arrangements may be used to provide the required cyclical unidirectional voltage. Also, a pair of controlled rectifiers connected in a back-to-back arrangement may be used in lieu of a full wave bridge with a single controlled rectifier connected within the bridge.

Accordingly, it will be understood that the control circuits described herein are intended as illustrative examples of the invention and that the invention is not limited to such examples thereof. It is intended, therefore, by the appended claims to cover all such modifications that fall within the true spirit and scope of the invention.

What I claim is new and desire to secure by Letters Patent of the United States is:

1. A motor control system for operating a motor from a power source, said system comprising: a motor having an armature and a shunt field winding, said shunt field being connected across said power source, a phase control circuit including a charging capacitor and at least one solid state switching device having an anode, a cathode and a gate, circuit means including an electrical connection joining the cathode of said device in circuit with the armature, said circuit means connecting said device and armature across the power source, current control means connected in circuit with said charging capacitor for controlling the charging current supplied to said charging capacitor, the rate at which charging current is supplied to the said charging capacitor determining the point in each cycle of said power source when said solid state switching device is fired, said control means including circuit connections for diverting current from said charging capacitor, a variable impedance means including a transistor to limit the diversion of said current, said transistor having a base, emitter and collector, said emitter and collector connected in said circuit connector for diverting current from said charging capacitor, a reference voltage means coupled with said variable impedance means, and a feedback circuit for applying at said voltage reference means a feedback signal corresponding to the speed of said armature, said variable impedance means being varied in response to the difference between said reference voltage and said feedback signal, said variable impedance means blocking the current diverted from said charging capacitor when said feedback signal from said armature is less than said reference voltage and causing the current diverted from said charging capacitor to increase as said feedback signal exceeds the reference voltage in order to regulate the speed of said motor.

2. The control system set forth in claim 1 wherein an impedance element and a unidirectional conducting device are connected serially and in circuit with the charging capacitor and the connection between the cathode of the switching device and the motor, said unidirectional conducting device being poled to conduct current away from said charging capacitor when the back electromotive force of the armature is substantially zero, said back electromotive force causing the current to decrease until said unidirectional conducting device blocks the current when the armature reaches a preselected speed.

3. A motor control system comprising: a motor having an armature and a shunt field winding, a cyclical power source, a phase control circuit energized from said power source and including at least one solid state switching device having an anode, cathode and gate, said solid state switching device and said armature being serially connected by an electrical connection between the cathode of said device and the armature in circuit with said power source, said shunt field winding being connected across said power source and in parallel circuit relation with said armature, said solid state switching device being triggered into conduction at a phase angle determined by the rate at which charging current is supplied to charging capacitor, a current control means connected in circuit with said charging capacitor and said power source to provide a control for the speed of said motor, a unidirectional conducting device connected in circuit with said charging capacitor and in circuit with said electrical connection between said cathode and armature, said unidirectional conducting device being poled so as to divert current away from said charging capacitor, and an impedance element connected in series circuit relationship with said unidirectional conducting device, said impedance element limiting the current diverted from said charging capacitor as said motor comes up to a preselected speed to delay the firing of said solid state switching device and thereby provide a limit on the starting current, said back electromotive force of said armature causing said unidirectional conducting device to be reversely biased and block current when said armature comes up to the preselected speed.

4. A speed control circuit for operating a motor from a power source, said motor having an armature and a shunt field winding, said speed control circuit comprising: a phase control circuit means adapted for connection to said power source and including at least one solid state switching device having an anode, cathode and gate and a charging capacitor, said cathode of solid state switching device being adapted for connection with the armature, a resistor connected in circuit with said charging capacitor and said direct current source to set the maximum amount of charging current, the rate at which said charging capacitor is charged with current determining the point in each half cycle of the power source when said switching device is fired, circuit means providing a path for current diverted from said charging capacitor, said circuit means including a variable impedance means to limit the diversion of said current, a reference voltage means coupled with said variable impedance means, a feedback circuit means for applying at said voltage reference means a feedback signal proportional to the back electromotive force of said armature and being adapted for connection with said cathode, the impedance of said variable impedance means being varied in response to the difference between said reference voltage and said feedback signal, said variable impedance means causing the diversion of current from said charging capacitor to decrease when said feedback signal is less than said reference voltage and to increase when said feedback signal exceeds the reference voltage to thereby regulate the speed of said motor.

5. The speed control circuit set forth in claim 4 wherein a serially connected resistor and diode are connected at one end to said charging capacitor and at the other being adapted for connection to said cathode of the switching device and said motor, said diode being poled so that current is conducted away from said charging capacitor under stall conditions to limit the current supplied to said armature to a predetermined value.

6. The speed control circuit set forth in claim 4 wherein said feedback circuit means includes a potentiometer for selectively adjusting the proportional part of the back electromotive force of said armature applied at said reference voltage means, said potentiometer providing a selective control of the motor speed.

7. A speed control and regulating circuit for operating a motor having an armature and a shunt field winding from a cyclically varying power source, said speed regulating and control circuit comprising: a phase control circuit for supplying the armature with controlled current pulses, said phase control means being adapted for connection with the power source and including a charging capacitor and at least one solid state switching device having an anode, a cathode and gate, said cathode of said switching device being adapted for connection with the armature of the motor, circuit means for connecting said armature and switching device across the power source, the rate at which said charging capacitor is charged to a predetermined voltage determining the phase angle in each half cycle of the power source at which said solid state switching device is triggered into conduction, a resistor connected in circuit with said charging capacitor for controlling the supply of charging current, a transistor having an emitter, a collector and a base, said emitter and collector being connected in circuit with said charging capacitor to provide a path for the diversion of current from said capacitor, a voltage reference means connected in circuit with the base of said transistor, a feedback circuit means coupled with said reference voltage means to apply thereto a feedback signal proportional to the back electromotive force of the armature, said impedance between the collector and emitter being varied in response to the variation of the feedback signal with respect to the reference voltage to thereby regulate the speed of the armature.

8. The speed control and regulating circuit set forth in claim 7 wherein a serially connected resistor and diode are connected at one end to said charging capacitor and are adapted for connection at the other end thereof to the motor and the cathode of said switching device, said diode being poled to conduct current away from said charging capacitor when the back electromotive force of the motor is zero thereby to limit the current supplied to the armature at stall speeds.

9. A speed regulating and control circuit for operating a motor having an armature and a field winding from a cyclically varying power source, said speed regulating and control circuit comprising: at least one solid state controlled rectifier having an anode, a cathode and gate, a relaxation oscillator including a unijunction transistor having a base-one, a base-two and an emitter electrode and including a serially connected charging capacitor and resistor connected in circuit with the emitter electrode of said unijunction transistor, said base-one and base-two electrodes, said serially connected resistor and capacitor being adapted for connection across said cyclical power source, said transistor being switched into conduction when the voltage at the emitter electrode reaches the peak point value of said transistor, connections for placing said switching device and armature across the power source, said cathode of said solid state controlled rectifier being adapted for connection with the armature of said motor, circuit means coupling said relaxation oscillator to the gate and cathode of said controlled rectifier to supply a firing pulse thereto when said capacitor is charged to the peak point voltage of said unijunction transistor, a transistor having a collector, an emitter and base, said emitter and collector of said transistor being connected in circuit with said charging capacitor to provide a path for the current diverted from said charging capacitor, a Zener diode connected in circuit with said base and having a predetermined reverse breakdown voltage, a voltage dividing circuit connected in circuit with said Zener diode and adapted for connection to said armature and said cathode to apply at said Zener diode a proportional part of the back electromotive force of the armature, said Zener diode causing current to be conducted to the base of said transistor to vary the impedance between said collector and emitter of said transistor when said proportional part of the back electromotive force exceeds the breakdown voltage of said Zener diode thereby to regulate the speed of said armature by delaying and advancing the firing angle of said controlled rectifier.

10. The speed regulating and control circuit as set forth in claim 9 wherein a serially connected impedance element and diode are connected in circuit with said charging capacitor at one end and being adapted for connection at the other end thereof to said cathode and armature, said diode being poled to divert current from said charging capacitor and delay the firing of said controlled rectifier when the back electromotive force of said armature is zero thereby limiting the current to a predetermined value.

11. In a motor control system for operating a motor at preselected speeds and including a phase control circuit having at least one solid state switching device having an anode, a cathode and a gate, said solid state switching device connected in circuit with said motor, the improvement comprising: a firing circuit coupled with the solid state switching device for phase firing said device and including a charging capacitor, a current control means connected in circuit with said charging capacitor for controlling the charging current supplied to said capacitor, the rate at which current is supplied to said charging capacitor determining the point in each cycle of the power source when the solid state switching device is fired, said current control means including a variable impedance means connected in circuit with said charging capacitor for diverting current therefrom, reference voltage means coupled with said variable impedance means, and a feedback circuit for applying at said reference voltage means a feedback signal corresponding to the speed of said motor, said variable impedance means blocking the diversion of current from said charging capacitor when said feedback signal is less than said reference voltage, and the impedance of said variable impedance means being varied in response to the difference between said reference voltage and said feedback signal when said feedback signal exceeds said reference voltage to cause current to be diverted from said capacitor.

References Cited by the Examiner
UNITED STATES PATENTS

| | | | |
|---|---|---|---|
| 2,899,620 | 8/59 | Anger et al. | 318—331 |
| 3,095,534 | 6/63 | Corkrell | 318—331 X |

ORIS L. RADER, *Primary Examiner*.